(12) United States Patent
Monson et al.

(10) Patent No.: US 6,400,506 B1
(45) Date of Patent: Jun. 4, 2002

(54) VISUALLY SEAMLESS IMAGE SYSTEM

(75) Inventors: Robert James Monson, St. Paul; Michael Edward Smith, St. Bonifacius, both of MN (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/455,433

(22) Filed: Dec. 6, 1999

(51) Int. Cl.[7] .................. G03B 21/56; G03B 21/22; G03B 21/26; H04N 5/64
(52) U.S. Cl. .................. 359/460; 353/30; 353/75; 348/841
(58) Field of Search .................. 353/75, 97, 30, 353/94; 359/449, 450, 460, 443; 348/745, 806, 832, 841

(56) References Cited

U.S. PATENT DOCUMENTS

| | | | |
|---|---|---|---|
| 4,974,073 A | 11/1990 | Inova | 358/87 |
| 5,382,990 A * | 1/1995 | Hata et al. | 353/94 |
| 5,673,145 A | 9/1997 | Wilson | 359/449 |
| 6,219,011 B1 * | 4/2001 | Aloni et al. | 345/1 |

* cited by examiner

Primary Examiner—Russell Adams
Assistant Examiner—Magda Cruz

(57) ABSTRACT

A baffle and screen arrangement for use in a rear projection display system with multiple imagers with the baffle being positionable with respect to the display screen of the console unit so that the baffle can interfere with at least one of the images produced by the imagers to allow the images to visually merge into a single, contiguous image with no halo effect, overlap, or excessive brightness and gaps. In one embodiment the baffle has an irregular, non-reflective light-absorbing surface to further reduce excessive unwanted image light from hitting the display screen and causing unwanted distortion.

13 Claims, 3 Drawing Sheets

VISUALLY SEAMLESS IMAGE SYSTEM

FIELD OF THE INVENTION

The present invention pertains to rear projection systems, and more specifically, to a rear projection console with multiple projectors that uses a baffle arrangement to allow a user to create a visually seamless, sharp image without the use of expensive optics.

BACKGROUND OF THE INVENTION

The method of using multiple projectors to produce a nearly contiguous image is old in the art. U.S. Pat. No. 4,974,073 (Inova) creates a contiguous image in a forward projecting system using multiple projectors and a signal ramping process to blend the images together. Similarly, movie theaters in previous eras have used multiple techniques, including several projectors projecting at multiple screens to create larger images for viewing audiences with varying degrees of success. The fundamental problems that have arisen in using multiple projectors to create a single image are the difficulty in aligning the projected images in timing, that is, to have the output of one projector matching the output of another frame by frame, and further, the difficulty in aligning the edges of the multiple images with one another in a contiguous fashion, especially with larger viewing surfaces.

There have been similar attempts to create a contiguous image on a display screen with rear projection devices such as the one illustrated in U.S. Pat. No. 5,673,145 (Wilson), which shows a multi-panel viewing section. There are gaps in between these panels however. Again, problems arise in trying to arrange contiguity between the panels in either projection frame timing or projection alignment.

The present invention, in its typical embodiment, has an oblong screen that can accept two or more projections placed thereupon, while at the same time having no framing system to disrupt the contiguity of multiple projections. Because of the differences in imagers, it is challenging to match video images with no gap and no overlap between the images. In the prior art, when two images arc projected side by side onto a single screen, there will normally be a seam between the two images which the viewer sees as a gap or overlap. While the Inova patent address the problem for front projection screens, the problems in the scope of rear projection screens and especially console screens—a scope in which the screens are made of different materials to project the image through the screen remains a problem. While the device shown in the Inova Patent requires the use of expensive ramp generators and synchronization devices to blend images together. In contrast, the present invention creates a visually seamless, contiguous image on a rear projection screen without the use of expensive digitalization equipment

DESCRIPTION OF THE PRIOR ART

U.S. Pat. No. 4,974,073 illustrates a seamless video display that uses three forward projecting ramp projectors and a synchronizer to produce a contiguous image.

U.S. Pat. No. 5,673,145 illustrates a multiple panel rear projection screen system which utilizes especially narrow perimeter edges on each panel to minimize image loss between panels.

SUMMARY OF THE INVENTION

The present invention provides a method and apparatus to create a visually seamless image for a rear projection system. The invention provides a method for merging at least two images into a seamless, contiguous image on a display screen utilizing a baffle arrangement. The baffle which is spaced from the screen sufficiently far so as to interfere and block at least one projected images before the image reaches the display screen to eliminate image overlap on the screen.

DESCRIPTION OF THE PREFERRED EMBODIMENT

Figure 1:
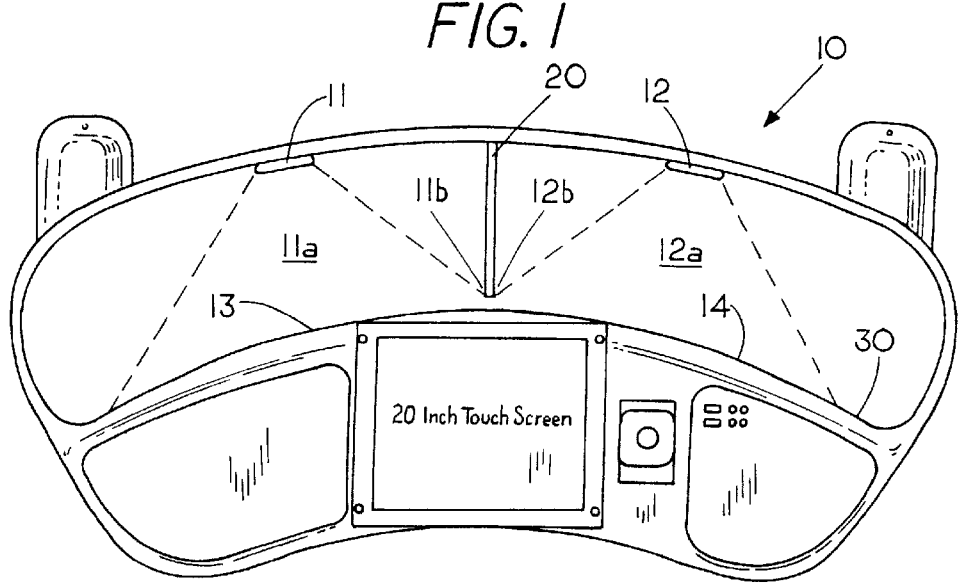
FIG. 1 shows a top cut-away view of the display system wherein the baffle is extended the correct distance to create a visually seamless image on a screen.

FIG. 1 illustrates a top cut-away view of the rear projection system or display system 10 in operation. A first imager 11 projects an image 11a onto the rear of a left side 13 of a display screen 30. Typically, rear display screens are known in the art and constructed of multiple layers of semi-translucent material to allow sufficiently light to penetrate the screen so the image is viewable from the front.

In the embodiment shown in FIG. 1, a portion of the projected image 11a is interfered by one side of a baffle 20 before the entirety of beam 11a reaches the left side 13 of the display screen 30. Similarly, a second imager 12 projects an image 12a onto the rear of the right side 14 of display screen 30. Similarly, a portion of the projected image 12a is interfered with by the opposite side of baffle 20 before the entirety of the beam 12a reaches the right side 14 of the display screen. In FIG. 1, the baffle 20 is spaced sufficiently far from screen 13 and 14 so that the images 11a and 12a appear on the screen 30 as a single, seamless, contiguous image. That is, the sides of baffle 20 disrupt a portion of at least one of the projected images 11a or 12a before the projected image reaches it's respective screen side 13 or 14. The baffle 20 is made of a non-reflective material so that it absorbs the light of projected images to prevent light from reflecting on the screen and creating "bright" spots. It should be noted that although the image projectors 11 and 12 are shown at the very rear of the interior of the console unit, it is envisioned that they could be configured in many ways inside of the console using mirrors and the like to project a contiguous image onto a screen while keeping the console compact.

Figure 2:
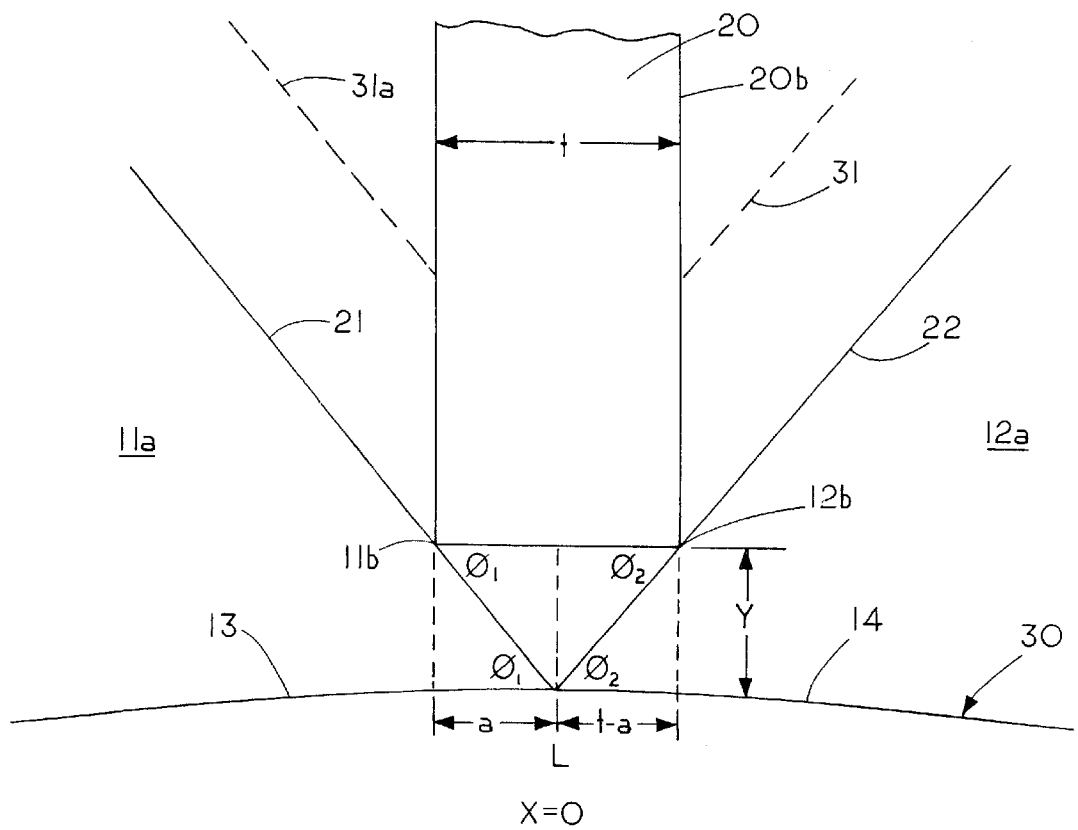
FIG. 2 shows a close-up view of the baffle in FIG. 1.

FIG. 2 illustrates a close-up view of the end of baffle 20 of FIG. 1 located within the display system 10. In this embodiment the baffle is provided with a smooth non-reflective light absorbing material 20b. Note that in FIG. 2, the baffle 20 has been spaced sufficiently far from the screen 30 so that the images 11a and 12a produced by imager 11 and imager 12 unite in a single, visually contiguous image on the display screen 30. That is, the distance "x" between the edges of the images is zero. It is in this condition that the two images, which would normally interfere in the peripheral region of the images appear as a single visually seamless image.

In FIG. 2 the distance of the end of the baffle to the screens 13 and 14 is indicated by "y" with the distance "y" being the proper distance to obtain a visually seamless image on screens 13 and 14. Note, left ray 21, which is a portion of the image 11a, passes baffle 20 at left interference point 11b without being absorbed by baffle 20, and similarly, right ray 22, which is a portion of the image 12a, passes baffle 20 at right interference point 12b without being absorbed by baffle 20. When the screen distance between rays 21 and 22, which is denoted by the alphanumeric character "x," is equal to zero, the two rays 21 and 22 intersect on the back side of the display screen 13 and 14 at the position L. Generally, if the distance between the rays "x" is less than one eighth of an inch, the two images appears to the eye as a single image. Thus, even thought the images do not match perfectly, to the human eye the images appear as a visually seamless image if the distance "x" is kept small. However, an advantage of the present inventions is that one can precisely match the edges of the two images on the screen. It will be understood that the dimension "x" will also depend on other factors such as the distance of the viewer from the screen.

FIG. 2 shows images projected from both sides when the distance "x" equals zero or substantially zero as the images meet at line L. In order to determine the distance "y" that the baffle needs to be positioned from the screen 30 to visually match the images one can measure or determine the angle $\emptyset_2$ that the light ray 22 makes with the screen 13, 14 and the angle $\emptyset_1$ that light ray 21 makes with screen 13, 14. In the embodiment shown the light rays 21 and 22 both impinge at the same angle so that angle $\emptyset_1$=angle $\emptyset_2$. Under these conditions and a baffle of thickness "t" the edges of the two images 11a and 12a should meet halfway from the edges of the baffle, in other words the junction line L should be a distance "a" from the side of the baffle which is equal to t/2. If one knows the thickness "t" of the baffle one can readily determine the distance "y" the baffle needs to be placed from the screen by solving the equation tangent $\emptyset$=y/(t/2), which yields "y"=(t/2) tan $\emptyset$. In the event the light rays do not image at the same angle $\emptyset$ on each side of the baffle one must first determine the position of line L.

When the digital imagers are not projecting the light rays 21 and 22 at the same angle $\emptyset$ one can solve for the distance "a" by knowing each light ray angle and the thickness "t" of the baffle. For example, if the angle of ray 22 impinges on the screen at angle $\emptyset_2$ and the angle the ray 21 impinges on the screen at angle $\emptyset_1$ then the distance "a" can be determined as follows: tangent $\emptyset_1$=y/a and tangent $\emptyset_2$=y/(t−a). By solving the two equations for "a" we obtain: (a) Tangent $\emptyset_2$=(t−a) tangent $\emptyset_1$. Since we know the angles $\emptyset_1$ and $\emptyset_2$ as well as the thickness "t" we can solve for the distance "a" where the two images meet. Knowing where the two images meet one can then solve for the distance "y" to determine the spacing of the baffle from the screen in order to produce the visually seamless image on the screens 13 and 14.

To illustrate the elimination of rays that would overlap on screens 13 and 14, reference should be made to secondary rays 31a and 31 which are rays from the imagers which are interfered and absorbed by the sides of the baffle 20, and therefore never reach the screen. In the embodiment shown in FIG. 2, the baffle 20 has a smooth and regular surface 20b although in FIGS. 4 and 6 irregular surfaces are shown to keep unwanted light rays from bouncing to the display screen 30. Other textures that prevent light reflection onto the display screen could be used.

Thus in the present invention one seeking to determine the proper distance of the baffle "y" from the screen to obtain a visually seamless image first determines the position "L" of the intersection or junction line of the two images beneath the baffle 20 by determining the angle at which light rays 21 and 22 impinge on the screens 13 and 14. For those situations when the images 11a and 12a are positioned so the light rays 21 and 22 on both sides of the baffle 20 impinge at the same angle $\emptyset$ the line of image matching occurs at line L which is a halfway distance t/2 from each side of the baffle. Knowing the thickness of the baffle one can solve for "y" according to the formula y=(t/2) tangent $\emptyset$. The baffle is then positioned the distance "y" from the screen to produce the visually seamless image.

Figure 3:
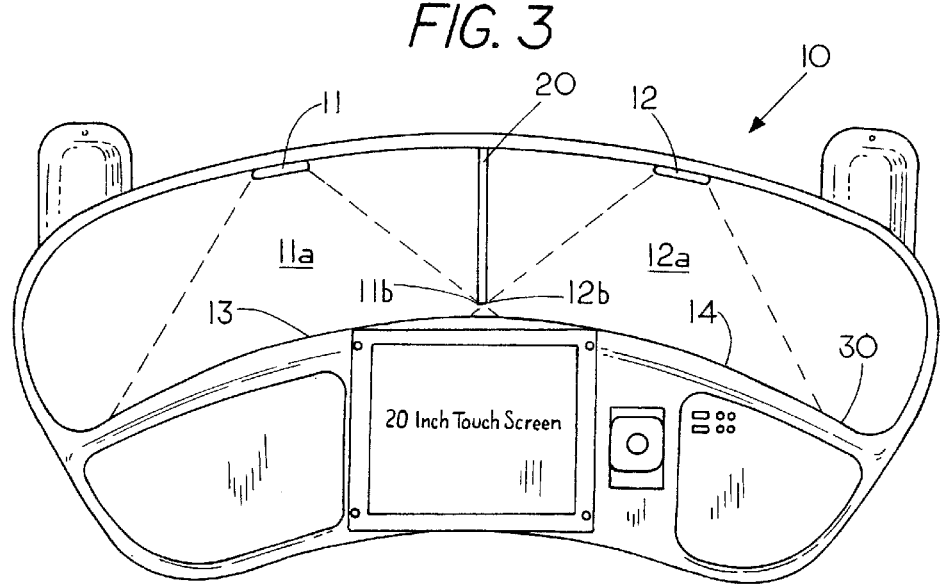
FIG. 3 shows a top cut-away view of the display system wherein the baffle is not extended a sufficient distance to create a seamless image on a screen.

FIG. 3 shows a top, cut-away view of the rear projection system 10 wherein the baffle 20 has not been properly positioned and the images 11a and 12a overlap upon the display surfaces (13 and 14). The left and right interference points 11b and 12b, the points closest to the display where images are interfered with but still reach the display, are located farther away from the display screen. As such, the images 11a and 12a substantially overlap on the display screen (13 and 14). This overlapping will produce an undesired brighter area on the screen 30 which is distracting to the console user.

Figure 4:
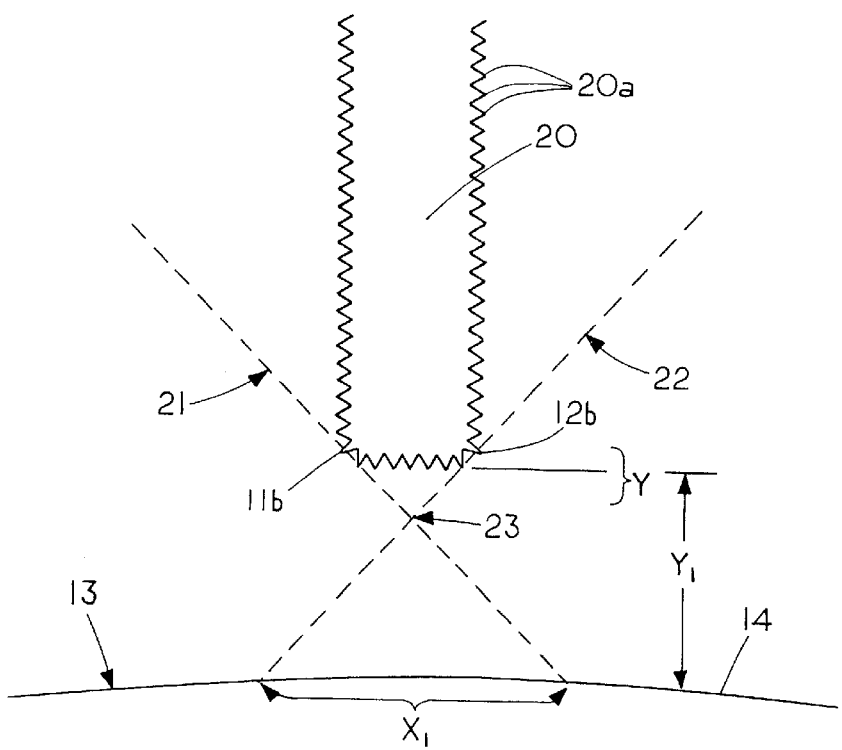
FIG. 4 shows a close-up view of the baffle in FIG. 3.

FIG. 4 shows the console of FIG. 3 in close-up. The left ray 21 and right ray 22 are the image waves from the projector that are respectively interfered with by the baffle 20 at left interference point 11b and the right interference point 12b. In FIG. 4, the baffle 20 is located a distance "$y_1$" too far away from the display (13 and 14). The result is that the ray 21 and ray 22 cross at an intersection point 23 well above the display, causing there to be a significant image overlap of rays to the left of ray 21 and rays to the right of ray 22 with the width of the overlap image represented by "$x_1$". This view of the baffle arrangement 20 shows that the baffle 20 has is properly spaced from the screen, and as a result, an overlapping image forms on the display screen 30 thus producing a line between images. To alleviate this condition the baffle 20 needs to be positioned closer to screens 13 and 14.

Figure 5:
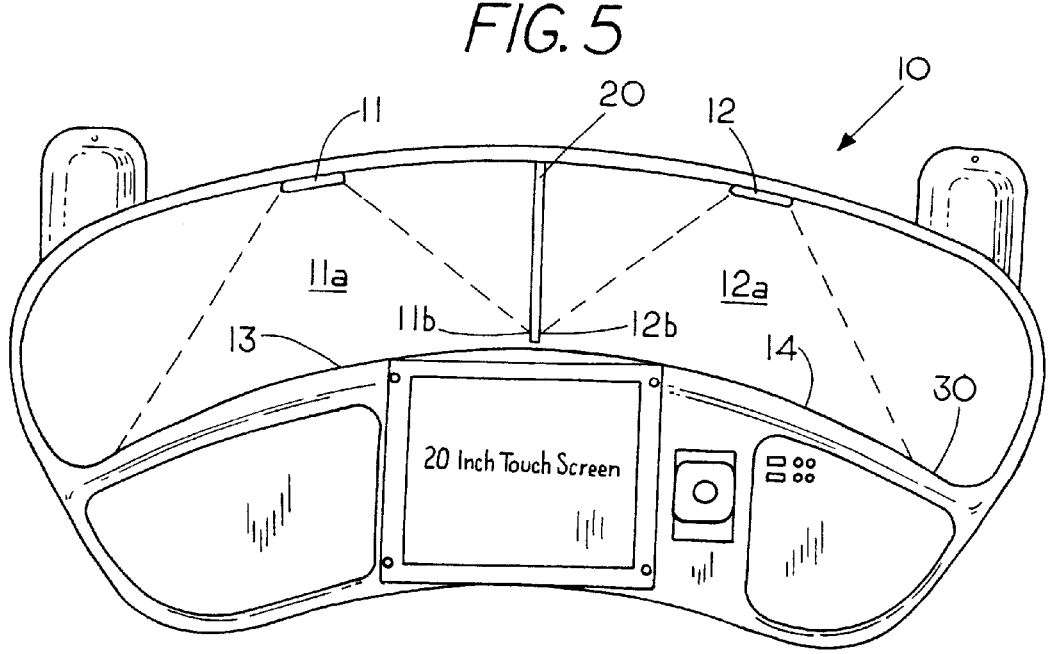
FIG. 5 shows a top cut-away view of the display system wherein the baffle is extended too far to create a seamless image on a screen.
Figure 6:
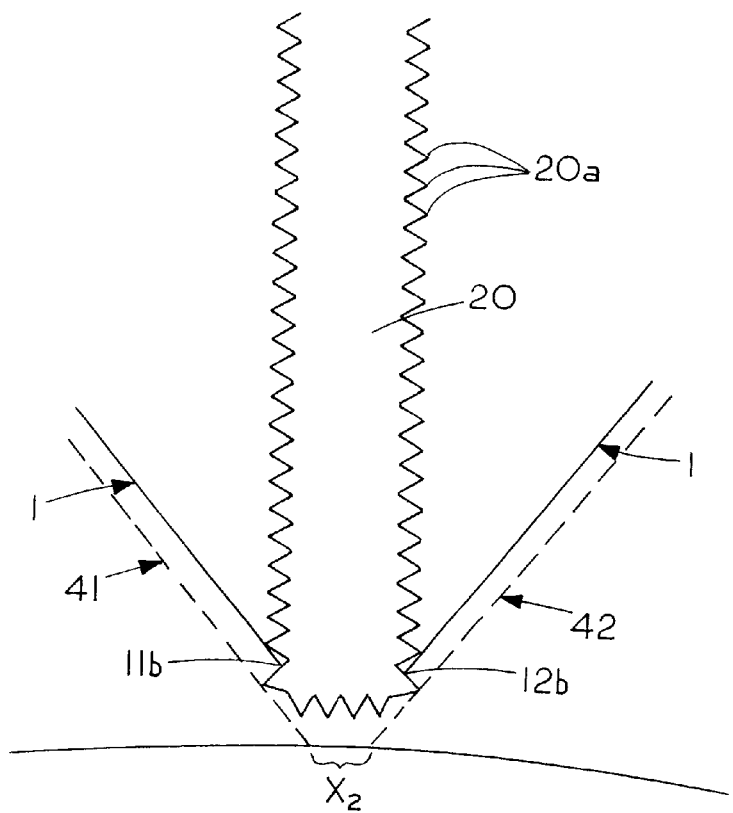
FIG. 6 shows a close-up view of the baffle in FIG. 5.

FIG. 5 shows a top, cut-away view of the display console 10. In FIG. 5, the baffle 20 has been set too close to the display screen (13 and 14), and as a result, a non-contiguous image has been formed along the display screen (13 and 14). FIG. 6 shows the baffle of FIG. 5 in close-up. Rays 21 and 22 are completely interfered with by the baffle 20, and as such, the image that does form (as represented by phantom rays 41 and 42) onto the screen has a significant gap "$x_2$". This gap will have no images on it whatsoever, so the viewer of the display screen will see that the image is very clearly, non-contiguous. Further, if the baffle gets excessively close to the display screen or actually touches it, baffle 20 will create an unlighted area upon the surface of the display preventing the viewing of a contiguous image. Thus it will be seen that with the present invention, the proper positioning of the end of the baffle from the screen can be used to inexpensively form a visually seamless image. That is, by positioning a baffle sufficiently far from the rear projection screen so as not to block passage of light thereunder one does not leave a dark baffle outline on the screen. Although not in contact with the screen the baffle is sufficiently close so as to block at least a portion of one of the images onto the rear projection screen one can limit the overlap of the image and the second image so that the first image and the second image on the rear projection screen visually appear as a contiguous seamless image.

While the description contained herein describes a two imager system, it is envisioned that this invention could be utilized in a display system with two, three, or more imagers and multiple baffles.

In the embodiment shown, the end of baffle 20 is positionable with respect to screen 13 and 14. Typically, the postionable baffle 20 can be positioned by a mechanical means such as a gear drive and motor. On the other hand, if the imagers remain in a fixed position within the display system, the baffle can be fixed in a proper position within the display system.

We claim:

1. A rear projection system for forming a visually seamless image from multiple images comprising:
   a housing;
   a rear projection screen located in said housing;
   a first imager, said first imager projecting a first image onto said rear projection screen with said first image having a peripheral region;
   a second imager, said second imager projecting a second image onto said rear projection screen with said second image having a peripheral region with the peripheral region of said second image normally overlapping with the peripheral region of said first image; and
   a baffle, said baffle having a first side and a second side, said baffle located proximate said rear projection screen and spaced therefrom sufficiently far so as not to block projection of images thereunder but sufficiently close so that said first side of said baffle blocks projection of a portion of said first image onto said rear projection screen and said second side of said baffle blocks projection of a portion of said second image onto said rear projection screen to thereby limit the overlapping of the first image with the second image on said rear projection screen so that to a viewer the first image and the second image on said rear projection screen visually appear on the screen as a single continuous image.

2. The rear projection system of claim 1 wherein the first imager and the second imager project images in a side-by-side fashion on the rear projection screen.

3. The rear projection system of claim 2 wherein the baffle is made of a non-reflective light-absorbing material.

4. The rear projection system of claim 3 wherein the baffle is postionable with respect to the rear projection screen.

5. The rear projection system of claim 1 wherein the rear projection screen is comprised of a semi-translucent material to allow the first and second images to penetrate the rear projection screen so as to be seen by a viewer on the side opposite of where the image is directed.

6. The rear projection system of claim 1 wherein the baffle has irregular edges.

7. A display system for the projection of a visual image thereon comprising:
   a housing;
   a first imager, said first imager projecting a first image onto a display screen;
   a second imager, said second imager projecting a second image onto said display screen, said second image on said display screen having a portion that normally overlaps with a portion of said first image projected on said display screen; and
   a baffle, said baffle located in the housing and between said first image and said second image, said baffle spaced from said display screen but positioned sufficiently close to the display screen to limit the overlap of said first image and said second image so that the first image and the second image visually appear as a single image on said display screen.

8. The display system of claim 7 wherein the baffle blocks a portion of said first image and said second image to create a visually seamless image on the display screen.

9. The display system of claim 7 wherein the display screen is comprised of a semi-translucent material.

10. The display system of claim 7 wherein the baffle has irregular edges.

11. A method for generating a visually seamless image from multiple image projectors comprising;
    projecting a first image onto a rear projection screen;
    projecting a second image onto the rear projection screen with the first image partially overlapping the second image; and
    positioning a baffle having a first side and a second side sufficiently far from said rear projection screen so as not to block passage of light thereunder but sufficiently close so as to block a portion of said first image with said first side and said second image with said second side to limit the overlap of the first image and the second image so that the first image and the second image on said rear projection screen visually appear as a contiguous seamless image.

12. A method for generating a visually seamless image from multiple image projectors comprising the steps of:
    projecting a first image having a light ray that impinges on a screen at a first angle $Ø_1$;
    projecting a second image having a light ray that impinges on the screen at a second angle $Ø_2$;
    determining the thickness "t" of a baffle for positioning proximate the screen and between the first imager and the second imager;
    determining the distance "a" that the first image must extend under the baffle to meet with the second image that extends under the baffle and the distance "(t−a)" that the second image must project under the baffle to form a visually seamless image on the screen;
    determining the distance "y" the baffle must extend from the screen by solving the equation y=a tangent $Ø_1$.

13. The method of claim 12 wherein the angle $Ø_1$ that the image from the first imager $Ø_1$ is equal to the angle $Ø_2$ from the second imager.

* * * * *